United States Patent [19]

Schuler et al.

[11] Patent Number: 5,605,966
[45] Date of Patent: Feb. 25, 1997

[54] MICROCAPSULES CONTAINING A CORE MATERIAL SUITABLE AS A LEVELING AGENT

[75] Inventors: Bernhard Schuler, Mannheim; Georg Bobar, Bad Duerkheim; Tilmann Korth, Wachenheim; Ottokar Flocken, Carlsberg; Peter Gleich, Flein, all of Germany

[73] Assignee: BASF Aktiensellschaft, Ludwigshafen, Germany

[21] Appl. No.: 165,660

[22] Filed: Dec. 13, 1993

[30] Foreign Application Priority Data

Dec. 15, 1992 [DE] Germany ............... 42 42 193.4

[51] Int. Cl.⁶ .................... C08F 8/30; C08L 63/00; C08L 75/04
[52] U.S. Cl. .................... 525/125; 264/4.7; 428/402.21; 428/402.22; 524/211; 524/904; 525/108; 525/155; 525/179; 525/185; 525/227; 525/902
[58] Field of Search ............. 264/4.7; 428/402.21, 428/402.22; 524/211, 904; 430/138; 525/108, 902, 125, 155, 179, 185, 227

[56] References Cited

U.S. PATENT DOCUMENTS

| 3,516,941 | 6/1970 | Matson | 264/4.7 X |
|---|---|---|---|
| 3,553,183 | 1/1971 | Field et al. | 524/904 X |
| 3,594,328 | 7/1971 | Schibler | 264/4.7 |
| 3,970,725 | 7/1976 | Tugukuni et al. | 525/208 |
| 4,097,404 | 6/1978 | Brown | 264/4.7 |
| 4,120,841 | 10/1978 | Takahashi et al. | 524/247 |
| 4,171,407 | 10/1979 | Elser et al. | 428/500 |
| 4,187,194 | 2/1980 | Wellman et al. | 264/4.7 |
| 4,708,924 | 11/1987 | Nagai et al. | 430/138 |
| 5,021,469 | 6/1991 | Langerbeins et al. | 523/201 |
| 5,384,358 | 1/1995 | Wamprecht et al. | 525/28 |

FOREIGN PATENT DOCUMENTS

| 026914 | 10/1982 | European Pat. Off. . |
| 088566 | 9/1983 | European Pat. Off. . |
| 3407829 | 9/1984 | Germany . |
| 1492753 | 11/1977 | United Kingdom . |

OTHER PUBLICATIONS

"New Thermosetting Acrylics Expand Powder Coating Versatility", Yousuf Modern Paints and Coatings Jun. 1989.
Patent Abstracts of Japan, vol. 15, No. 173 (C–0828), May 2, 1991 (English abstract of JP–A 3 039 382 –Feb. 20, 1991).

Primary Examiner—Richard D. Lovering
Attorney, Agent, or Firm—Keil & Weinkauf

[57] ABSTRACT

Microcapsules comprise a polymeric wall material and a polymeric core material which is suitable as a leveling agent for film formation by film-forming oligomers and polymers.

1 Claim, No Drawings

MICROCAPSULES CONTAINING A CORE MATERIAL SUITABLE AS A LEVELING AGENT

The present invention relates to microcapsules comprising a polymeric wall material and a polymeric core material which is suitable as a leveling agent for film formation by film-forming oligomers and polymers.

The present invention furthermore relates to special microcapsules of this type, their use in the production of coatings of film-forming polymers and powder formulations consisting essentially of a film-forming polymer and the microcapsules containing the leveling agent.

Microcapsules comprising polymeric wall materials and liquid, pasty or solid core materials, such as dye precursors, pigment pastes, fragrances or physiological active compounds, are generally known. This also applies to their production.

EP-A 88 566 discloses microcapsule toners which consist of polyurethanes or polyureas as wall material and a liquid or solid core, highly viscous materials, for example poly(meth)acrylates, being present in the core in addition to a dye.

German Laid-Open Application DOS 3,407,829 relates to pressure-fixable toners in microcapsule form, having a core material which comprises a mixture of a substance having a glass transition temperature (Tg) of less than +5° C. and a substance having a softening temperature of above 25° C.

EP-A 26 914 describes microcapsules for use in pressure-sensitive application systems, whose wall material consists of a melamine/formaldehyde condensate.

Furthermore, the production of coatings of film-forming polymers by the powder coating method is generally known. Here, a coating formulation in powder form is applied to the substrate, after which film formation is effected by heating.

However, since this film formation does not take place rapidly enough or to a sufficient extent, a leveling agent must generally be present. Such leveling agents are usually polymeric, relatively low-viscosity tacky substances. Owing to their tack, homogeneous mixing with the actual coating material is generally not possible.

In order to suppress the tack, leveling agents have to date been applied to special silicas. For example, M. K. Youssouf, Modern Paint and Powder Coatings, June 1983, pages 48–53, describes the use of Modaflow PIII from Monsanto, USA, which is a leveling agent applied to a special silica.

Individual components of the powder coating, such as binders, leveling agents on silica gel, pigments and other assistants, are usually melted with one another in an extruder, and the material obtained is then processed to give the desired powder.

However, the powder coatings obtainable in this manner still contain the lubricant silica gel, which then remains as an inorganic ballast material in the coatings and imparts to the latter only limited leveling and a generally undesirable matt and chalky appearance.

It is an object of the present invention to remedy the disadvantages described in the case of the powder coatings. In general, the object is to improve all those application processes where the presence of a leveling agent is advisable.

We have found that this object is achieved by the microcapsules defined at the outset. We have also found special microcapsules of this type, their use in the production of coatings from film-forming polymers and powder formulations comprising essentially a film-forming polymer in powder form and the microcapsules containing the leveling agent.

The polymeric organic core material of the novel microcapsules can in principle be of any the, provided that it performs its function as a leveling agent for a film-forming polymer.

Homopolymers of alkyl acrylates and copolymers containing predominant amounts of alkyl acrylates are of the greatest practical importance.

Homo- or copolymers containing from 80 to 100% by weight of such alkyl acrylates which, as homopolymers, have a glass transition temperature of less than 0° C., especially esters of acrylic acid with $C_2$–$C_{12}$-monoalcohols, such as ethyl acrylate, isopropyl acrylate, n-butyl acrylate, isobutyl acrylate, pentyl acrylate, n-hexyl acrylate or 2-ethylhexyl acrylate, are particularly suitable. The polymers may furthermore contain up to 20% by weight of ethylenically saturated comonomers, such as methacrylates, vinyl esters or vinylaromatic monomers, such as styrene.

Polyvinyl alkyl ethers, for example polyvinyl methyl ester, polyvinyl ethyl ester or polyvinyl isobutyl ether, are also suitable as polymeric, low-viscosity core material.

For the purposes of the present invention, low-viscosity is to be understood as meaning that the homo- or copolymers, i.e. the leveling agents, have a viscosity of less than 200 Pa.s (according to DIN 53,019 at 23° C.) in the solvent-free state. Preferably, the polymeric core materials have a viscosity of from 2 to 100, particularly preferably from 2 to 50, Pa.s. The glass transition temperature is advantageously below 0° C., particularly preferably from –10° to –50° C.

The preparation of such pollers is known and is described, for example, in U.S. Pat. No. 4,986,760 or in Ullman's Encyklopädie der Technischen Chemie, 4th Edition, Vol. 19, pages 382–384.

It is an essential property of microcapsules that core material and wall material dissolve in one another as little as possible or are immiscible. In the case of the homo- and copolymers preferred as leveling agents, suitable wall materials are mainly polymeric crosslinked organic substances having, preferably, the properties of a thermosetting plastic.

Otherwise, the material for the outer wall is not subject to any particular restrictions. For example, aminoplast resins, epoxy resins, polyamide resins, polyurethane resins, polyurea resins, poly(meth)acrylate resins, vinyl resins or mixtures thereof may be used as wall materials.

Walls of polyurethane and particularly preferably of aminoplast resins are particularly suitable.

The preparation of such microcapsules is known per se.

Where aminoplast resins are employed as wall material, urea/formaldehyde or melamine/urea/formaldehyde condensates can be used, but melamine/formaldehyde condensates are particularly preferred, melamine/formaldehyde precondensates which have a molar ratio of melamine to formaldehyde of from 1:1.5 to 1:6, preferably from 1:3 to 1:6, and are advantageously etherified with a $C_1$–$C_4$-monoalcohol being particularly preferred as starting materials for the wall material. Melamine/formaldehyde condensates partially etherified with methanol or butanol are particularly preferably used as starting material for the wall material. The preparation of such microcapsules is described in EP-A 26 914.

According to the invention, the leveling agent is dispersed in an aqueous phase at from 30° to 100° C., in particular from 60° to 85° C., with the aid of a high-performance dispersing apparatus. The aqueous phase preferably contains a sulfonate-containing polymer as a protective colloid, which prevents aggregation of the microcapsules and hence stabilizes the dispersion. Such sulfonate-containing polymers are described, for example, in German Patent Application P 42 09 632.4.

With constant dispersing with the high-performance dispersing apparatus, dispersion of the leveling agent in the aqueous phase is brought to a pH of from 3 to 6.5, preferably from 3.5 to 5, with the aid of an acidic compound, and an aqueous solution of a melamine/formaldehyde precondensate, which may be partially etherified, is added over a period of, as a rule, from 0.5 to 3 hours. The duration of addition is, as a rule, from 0.5 to 3 hours. The pH is kept constant during this time by continuous addition of an acidic compound. The acidic compounds used may be organic acids, for example formic acid or acetic acid, and inorganic acids, e.g. phosphoric acid. After the end of the addition of the melamine/formaldehyde precondensate, the microcapsule dispersion is, as a rule, postcured for a further 1 to 3 hours at from 70° to 100° C. The reaction is terminated by neutralization with a basic compound. Suitable basic compounds are organic bases, such as di- or triethanolamine, and inorganic bases, e.g. ammonia or sodium hydroxide solution.

The microcapsule dispersions thus obtained have microcapsules possessing diameters of from 1 to 200 μm, preferably from 1 to 100 μm.

The microcapsule dispersions may be mixed with dispersions of film-forming polymers to allow them to be used by conventional method for the production of coatings.

However, the novel microcapsules are particularly important for use in solid form. Drying may be effected in principle by all conventional methods, but spray drying is the most important.

If the microcapsule dispersion is converted into the solid form by spray drying, it is advisable, after curing, to add a suspension of melamine and water to the dispersion until the dried smear of the microcapsule dispersion on a glass plate no longer adheres.

The microcapsules are prepared in a manner such that the amount of active substance, i.e. of the leveling agent, in the core of the microcapsule is from 70 to 90% by weight, based on the total weight of microcapsule.

The novel microcapsules, which contain a low-viscosity homo- or copolymer having a glass transition temperature of below 0° C. as core material, are very useful in powder coatings. By using a microencapsulated leveling agent, the proportion of inert phase in the powder coating can be reduced.

Apart from the microencapsulated leveling agent, the powder formulations may be prepared in conventional compositions for the production of coatings by powder coating (cf. for example: M. K. Youssouf, Modern Paint and Coatings, June 1989, pages 48–53). The film-forming oligomers and polymers used may be the acrylate, methacrylate, polyester, polyurethane or epoxy resin binders conventionally employed for this method. Furthermore, the powder coatings usually contain pigments and assistants, for example benzoin or crosslinking agents conventionally used for this method.

The novel microcapsules which replace the conventional leveling agents applied to silica gel, are added to the powder formulation in amounts such that the proportion of microcapsules is from 0.1 to 10, preferably from 0.1 to 3, % by weight, based on the total weight of the powder coating.

By using the microencapsulated leveling agent, in which the amount of active substance is from 70 to 90% by weight, based on the total weight, the amount of inert phase can be reduced compared with the conventional leveling agents on silica gel carriers, which contain only from 55 to 65% by weight of active substance.

The melamine/formaldehyde precondensates used in Examples 1 and 2 below are products which carry on average 5.8 methylol groups per molecule of melamine, on average 2.3 methylol groups being etherified with methanol. The preparation is known to the skilled worker. The partially etherified melamine/formaldehyde precondensate is used in the form of an aqueous solution having a solids content of 70% by weight.

Preparation of the sulfonate-containing polymer 1,050 g of water were heated to 75° C. in a stirred vessel, and 0.15 g of potassium persulfate was added. A mixture of 80 g of acrylic acid, 80 g of methacrylate and 4 g of styrene, a solution of 236 g of 2-acrylamido-2-propanesulfonic acid in 400 g of water, which was neutralized with 305 g of 20% strength by weight aqueous NaOH, and a solution of 1.35 g of potassium sulfate in 150 g of water were added simultaneously in the course of one hour. Polymerization was then continued for a further 3 hours at 75° C. A colorless, slightly cloudy viscous solution having a solids content of 19% by weight was obtained.

Preparation of the microcapsules

EXAMPLE 1

In a stirred vessel, 550 g of a mixture of water and 140 g of the aqueous solution of the sulfonate-containing polymer were mixed with 520 g of polybutyl acrylate (Acronal® LR 8820, viscosity according to DIN 53,019 (23° C.) about 25 Pa.s). This mixture was heated to 80° C. and dispersed with the aid of a high-performance dispersing apparatus. 229 g of the partially etherified melamine/formaldehyde condensate were added in the course of one hour, the pH of the dispersion being kept at 4.5 with the continuous addition of 10% strength by weight aqueous formic acid. The dispersion was then stirred for a further two hours with the aid of a propeller stirrer.

Thereafter, a melamine suspension comprising 46 g of melamine and 125 g of water was added, and the mixture was then neutralized with 40 g of aqueous 50% strength by weight triethanolamine. The microcapsule dispersion had a solids content of 40.3% by weight and contained microcapsules having a diameter of from 1 to 40 μm. The dispersion was converted into a powder by spray drying. The powder thus obtained could be redispersed without agglomeration. The amount of active substance was 75% by weight, based on the total weight.

EXAMPLE 2

The procedure was similar to that of Example 1, except that 520 g of a polyvinyl ethyl ether (Lutonal® A25, viscosity according to DIN 53,019 (23° C.) about 5 Pa.s) was used instead of the polybutyl acrylate, and the melamine/formaldehyde precondensate was metered in at 70° C.

A microcapsule dispersion having a particle diameter of from 1 to 30 μm was obtained and was converted into a powder by spray drying. The amount of active substance was 75% by weight, based on the total weight.

Conventional powder coatings were prepared using the microencapsulated leveling agents according to Examples 1 and 2.

EXAMPLE 3

White powder coating based on polyester resin

- 610.83 g of carboxylated, saturated polyester resin (Uralac P 2347 from DSM Resins, NL)
- 45.97 g of a crosslinking agent (Araldit PT 810 from Ciba-Geigy AG, CH)
- 328.38 g of titanium dioxide (rutile)
- 9.85 g of a leveling agent
- 4.97 g of benzoin

EXAMPLE 4

White powder coating based on polyester/epoxy resin mixture

- 328.40 g of carboxylated, saturated polyester resin (Uralac 2347 from DSM Resins, NL)
- 328.40 g of epoxy resin (Epikote 1055/1004 from Shell Chemie BV, NL)
- 328.40 g of titanium dioxide (rutile)
- 9.85 g of a leveling agent
- 4.95 g of benzoin The powder coatings thus prepared were nontacky and free of aggregates.

For comparison, powder coatings which contained 9.85 g of a polyacrylate leveling agent which was applied to a special silica (Byk®—360 P from Byk Chemie GmbH, DE, 57% of active substance), instead of the leveling agent microencapsulated according to the invention, were prepared.

The powder coatings containing the leveling agent microencapsulated according to the invention have a higher proportion of active substance in the leveling agent.

We claim:

1. A powder formulation for the production of coatings, comprising:

a film-forming polymer in powder form; and a plurality of microcapsules comprising a polymeric core material and a polymeric resin wall material covering said core material;

said polymeric resin wall material being selected from the group consisting of an aminoplast resin, an epoxy resin, a polyamide resin, a polyurethane resin, a polyurea resin, a poly(meth)acrylate resin, a vinyl resin and mixtures thereof;

said polymeric core material comprising a leveling agent for the film-forming polymer, wherein said microcapsules are present in an amount of from 0.1 to 10% of the total weight of the powder formulation.

* * * * *

UNITED STATES PATENT AND TRADEMARK OFFICE
CERTIFICATE OF CORRECTION

PATENT NO.: 5,605,966

DATED: February 25, 1997

INVENTOR(S): SCHULER et al.

It is certified that error appears in the above-identified patent and that said Letters Patent is hereby corrected as shown below:

On the cover page, item [73], the assignee "BASF Aktiensellschaft" should be --BASF Aktiengesellschaft--.

Signed and Sealed this

Ninth Day of September, 1997

*Attest:*

BRUCE LEHMAN

*Attesting Officer*  *Commissioner of Patents and Trademarks*